(12) United States Patent
Delnoij et al.

(10) Patent No.: US 9,596,734 B2
(45) Date of Patent: Mar. 14, 2017

(54) ANTI-TAMPERING DAYLIGHT HARVESTING SYSTEM

(71) Applicant: PHILIPS LIGHTING HOLDING B.V., Eindhoven (NL)

(72) Inventors: Roger Peter Anna Delnoij, Lommel (BE); Jurgen Mario Vangeel, Beerse (BE); Michel Albertus Theodorus Klein Swormink, Eindhoven (NL); Petrus Antonius Verbeek, Deurne (NL); Johannes Martinus Maria Hensing, Veldhoven (NL); Johannes Jozef Wilhelmus Kalfs, Eindhoven (NL); Michiel Adriaanszoon Klompenhouwer, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/782,065

(22) PCT Filed: Apr. 3, 2014

(86) PCT No.: PCT/IB2014/060394
§ 371 (c)(1),
(2) Date: Oct. 2, 2015

(87) PCT Pub. No.: WO2014/162284
PCT Pub. Date: Oct. 9, 2014

(65) Prior Publication Data
US 2016/0066391 A1    Mar. 3, 2016

Related U.S. Application Data

(60) Provisional application No. 61/808,448, filed on Apr. 4, 2013.

(51) Int. Cl.
*H05B 37/02*    (2006.01)

(52) U.S. Cl.
CPC .......... *H05B 37/0218* (2013.01); *Y02B 20/46* (2013.01)

(58) Field of Classification Search
None
See application file for complete search history.

(56) References Cited

U.S. PATENT DOCUMENTS

| | | | | |
|---|---|---|---|---|
| 4,449,074 A * | 5/1984 | Luchaco | ............ | H05B 37/0218 250/205 |
| 5,598,066 A | 1/1997 | Wiesemann et al. | | |
| 5,808,294 A * | 9/1998 | Neumann | .......... | G05B 19/0426 250/214 AL |
| 5,821,853 A | 10/1998 | Gustavson et al. | | |
| 6,452,339 B1 | 9/2002 | Morrissey et al. | | |
| 6,933,486 B2 * | 8/2005 | Pitigoi-Aron | ...... | H05B 33/0857 250/205 |
| 9,288,875 B2 * | 3/2016 | Billig | ................. | H05B 37/0218 |

(Continued)

*Primary Examiner* — Crystal L Hammond
(74) *Attorney, Agent, or Firm* — Meenakshy Chakravorty

(57) ABSTRACT

The present invention relates to a method for controlling a lighting device in a daylight harvesting system. When a user tampers with a sensor, in order to decrease the light level light level measured and therefore increase the light intensity of the lighting device, the tampering is detected. Based on this tamper detection the light intensity of the lighting device is controlled based on a set value (e.g. 70% dimming).

9 Claims, 3 Drawing Sheets

(56) References Cited

U.S. PATENT DOCUMENTS

| | | | |
|---|---|---|---|
| 2005/0047133 A1* | 3/2005 | Pitigoi-Aron | H05B 41/3922 362/231 |
| 2011/0069960 A1* | 3/2011 | Knapp | H04L 12/43 398/103 |
| 2011/0133655 A1* | 6/2011 | Recker | H02J 9/02 315/159 |
| 2011/0254453 A1 | 10/2011 | Veskovic | |
| 2012/0001487 A1* | 1/2012 | Pessina | H04L 12/28 307/31 |
| 2012/0025717 A1* | 2/2012 | Klusmann | H05B 37/0218 315/152 |
| 2012/0080944 A1* | 4/2012 | Recker | H02J 9/02 307/25 |
| 2012/0091213 A1* | 4/2012 | Altonen | H05B 37/02 236/51 |
| 2012/0262069 A1* | 10/2012 | Reed | H05B 37/0245 315/130 |
| 2013/0229112 A1* | 9/2013 | Van Der Werff | H05B 37/0245 315/151 |
| 2014/0001846 A1* | 1/2014 | Mosebrook | H04L 12/2816 307/11 |

* cited by examiner

ANTI-TAMPERING DAYLIGHT HARVESTING SYSTEM

CROSS-REFERENCE TO PRIOR APPLICATIONS

This application is the U.S. National Phase application under 35 U.S.C. §371 of International Application No. PCT/IB2014/060394, filed on Apr. 3, 2014, which claims the benefit of U.S. Provisional Patent Application No. 61/808,448, filed on Apr. 4, 2013. These applications are hereby incorporated by reference herein.

FIELD OF THE INVENTION

The present invention relates generally to the field of daylight harvesting systems, and specifically to a control device, method and computer program product in the field of anti-tampering daylight harvesting systems.

BACKGROUND OF THE INVENTION

Daylight harvesting systems are known from, for example, U.S. Pat. No. 5,648,656 which discloses a system that controls both a level of artificial light as well as the level of daylight (e.g. through controlling blinds) in a room. Certain daylight harvesting systems allow users to override light intensity settings; an example of such a system is disclosed in U.S. Pat. No. 8,197,093. When users override light intensity settings to increase the light intensity compared to default light intensity settings, such systems can fall short of delivering predicted energy savings. To ensure energy savings are met, certain systems do not allow users to locally override default settings. Users can try to circumvent such restrictions by tampering with the daylight harvesting system, limiting the energy savings realized by such a daylight harvesting system. There is therefore a need for an improved daylight harvesting system.

SUMMARY OF THE INVENTION

The inventors have recognized that people in, for example, office buildings will tamper with sensors of daylight harvesting systems to increase light levels when such systems do not allow a user to (locally) override the default settings. Such tampering includes blocking the view of the sensor, applying a material to the sensor to (partially) block light from being detected, etc. It is an object of the present invention to provide an improved control device for controlling a lighting device in a daylight harvesting system. This object is achieved by providing a control device for controlling the light intensity of at least one lighting device operationally coupled to the control device. The control device comprising: an input arranged for receiving, from a light sensor operationally coupled to the input, light level measurements; and a controller arranged for determining, based on at least one light level measurement received via the input, whether the light sensor has been tampered with; and further arranged for controlling the at least one lighting device according to a fallback mode if it has been determined that the light sensor has been tampered with and controlling the at least one lighting device according to a daylight harvesting mode if it has been determined that the light sensor has not been tampered with; wherein the fallback mode comprises controlling the light intensity of the at least one lighting device based on a stored program accessible to the controller; and wherein the daylight harvesting mode comprises controlling the light intensity of the at least one lighting device based on the at least one light level measurement.

In an embodiment of the control device according to the invention, determining whether the light sensor has been tampered with comprises comparing the at least one light level measurement to a light sensor dark current value.

In another embodiment of the control device according to the invention, determining whether the light sensor has been tampered with comprises: a first step of receiving, via the input, a first light level measurement; a second step of controlling the at least one lighting device to either increase or decrease the light intensity; a third step of receiving, via the input, a second light level measurement; and a fourth step of comparing the first light level measurement to the second light level measurement.

In yet another embodiment of the control device according to the invention, determining whether the light sensor has been tampered with comprises comparing a first light level measurement received via the input in a first time period to a second light level measurement received via the input in a second time period; wherein the end of the first time period and the start of the second time period are at least one minute apart.

In a further embodiment of the control device according to the invention, the controller is further arranged to control an audio or visual indicator based on determining whether the light sensor has been tampered with.

In yet a further embodiment of the control device according to the invention, the controller is further arranged to transmit to an external monitoring system a signal indicating whether the light sensor has been tampered with.

In yet a further embodiment of the control device according to the invention, the control device further comprises the light sensor operationally coupled to the input of the control device.

In yet a further embodiment of the control device according to the invention, the control device is part of a daylight harvesting system, further comprising the at least one lighting device operationally coupled to the control device.

It is another object of the present invention to provide an improved method for controlling a lighting device in a daylight harvesting system. This object is achieved by providing a method of controlling the light intensity of at least one lighting device in a daylight harvesting system. The method comprising the steps of: receiving a light level measurement from a light sensor; determining whether the light sensor has been tampered with; and controlling the at least one lighting device in a daylight harvesting mode if the light sensor has not been tampered with and controlling the at least one lighting device in a fallback mode if the sensor has been tampered with; wherein the fallback mode comprises controlling the light intensity of the at least one lighting device based on a stored program; and wherein the daylight harvesting mode comprises controlling the light intensity of the at least one lighting device based on at least one light level measurement.

In an embodiment of the method according to the invention, determining whether the light sensor has been tampered with comprises comparing at least one light level measurement to a light sensor dark current value.

In another embodiment of the method according to the invention, determining whether the light sensor has been tampered with comprises: a first step of receiving a first light level measurement; a second step of controlling the at least one lighting device to either increase or decrease the light intensity; a third step of receiving a second light level measurement; and a fourth step of comparing the first light level measurement to the second light level measurement.

In yet another embodiment of the method according to the invention, determining whether the light sensor has been tampered with comprises comparing a first light level measurement received in a first time period to a second light level measurement received in a second time period; wherein the end of the first time period and the start of the second time period are at least one minute apart.

In a further embodiment of the method according to the invention, the method further comprises the step of controlling an audio or visual indicator based on determining whether the light sensor has been tampered with.

In yet a further embodiment of the method according to the invention, the method further comprises the step of transmitting to an external monitoring system a signal indicating whether the light sensor has been tampered with.

It is an object of the present invention to provide an improved computer program product for controlling a lighting device in a daylight harvesting system. This object is achieved by providing a computer program product for controlling the light intensity of at least one lighting device in a daylight harvesting system comprising software code portions for performing the steps of any embodiment of the method according to the invention when said product is run on a computer.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE FIGURES

In the following figures:

FIG. 5 shows schematically another embodiment of a control device according to the invention comprising a light sensor and in which the light sensor has been tampered with;

DETAILED DESCRIPTION OF THE FIGURES

Figure 1:
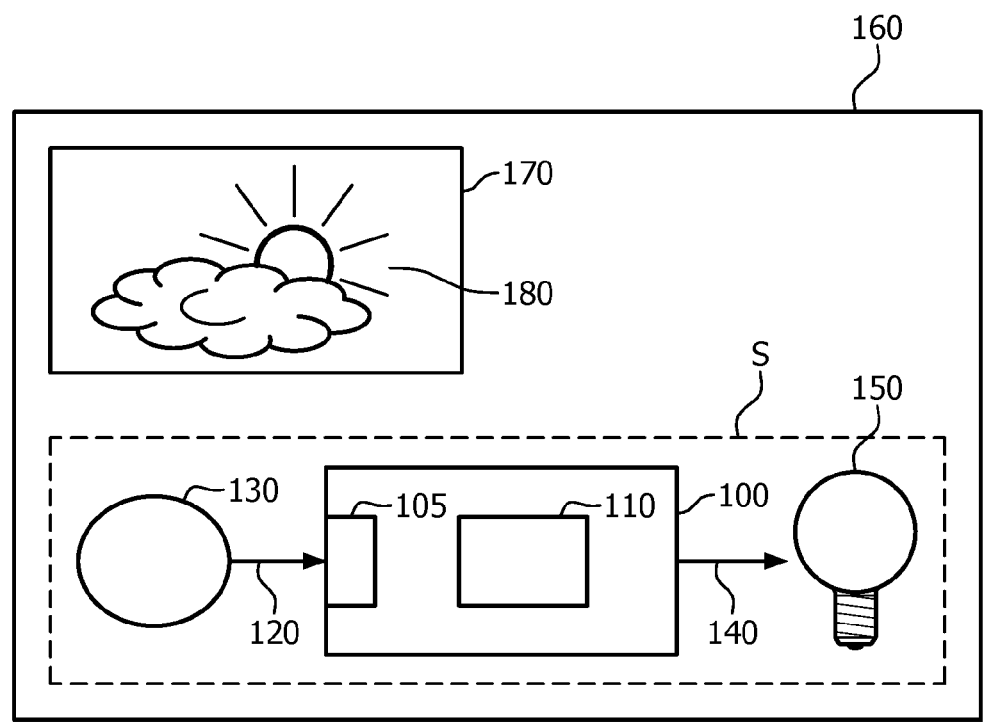
FIG. 1 shows schematically an embodiment of a daylight harvesting system comprising a control device according to the invention.

In FIG. 1 an embodiment of a daylight harvesting system S comprising a control device 100 according to the invention is shown. The control device 100 comprises an input 105 and a controller 110. The input is arranged to receive a signal 120 from a light sensor 130. The control device 100 and the light sensor 130 can be provided in a single housing or can be separate units. The control device 100 can be operationally coupled to one light sensor 130 or to multiple light sensors. The signal 120 sent by the light sensor 130 to the control device 100 is related to a light level measurement. Additional data can be included in the signal 120 (e.g. status information or data related to motion, occupancy or presence detection) and the signal 120 can be sent based on the light sensor 130 autonomously sending (pushing) information to the control device 100 or the control device 100 requesting information from (polling) the light sensor 130. Furthermore the signal 120 can be sent via a wired (e.g. dedicated or shared control cables, UTP cables) or a wireless connection (e.g. ZigBee or 802.11 compliant wireless connection) and the signal can be sent directly or via one or more other devices (such as a building management system or a router). The signal 120 related to a light level measurement can be sent periodically (e.g. when the light level measurement changes, based on a time interval, when a presence is detected) or continuously (e.g. an analogue signal related to a measured light intensity).

The controller 110 in the control device 100 can, based on receiving the signal 120 via the input 105, determine whether the light sensor has been tampered with. The controller 110 can compare the signal 105 to a light sensor's dark current value (i.e. the signal received when the sensor is not actively being exposed to light). As an example, when the signal 105 equals the light sensor dark current value or falls below a threshold related to the light sensor's dark current value the controller 110 can determine that the light sensor 130 has been tampered with. The comparison can comprise comparing a first light level measurement (e.g. lux level) or power measurement (e.g. voltage, power, resistance) to a second light level or power measurement. Such a comparison can be made once or multiple times before the controller 110 determines that a light sensor 130 has or has not been tampered with. Determining whether a light sensor 130 has been tampered with can be a discrete determination (i.e. either the light sensor has been tampered with or the light sensor has not been tampered with) or it can be a non-discrete determination (e.g. based on a scale or a likelihood that a light sensor 130 has been tampered with).

The light sensor's dark current value can be stored in the control device 100 (e.g. in a memory unit, not shown, accessible to the controller 110), included in the signal 120 received from the light sensor 130 or accessed from another device (not shown), such as from a server via the Internet. The light sensor's dark current value can be a single static value or can be selected, for example, locally (e.g. through dip switches or by pairing the light sensor 130 and the control device 100) or centrally (e.g. via a building management system). As another example, if the control device 100 can be used in combination with multiple types of light sensors, the dark current value for the specific light sensor 130 providing the signal 120 can be downloaded based on the control device 100 identifying the light sensor 130. The light sensor's dark current value can be static or dynamic (e.g. self-learning). Similarly the threshold related to the light sensor's dark current value can be stored, set or controlled locally or centrally and be static or dynamic. Such a threshold can be a pre-determined value or can be related to the dark current value (e.g. plus or minus a percentage of the dark current value) or to the range of values (e.g. minimum and maximum value or minimum and typical operational value) of the signal 120 received from the light sensor 130.

In another example, the controller 110 determines whether the light sensor 130 has been tampered with by generating a lighting device control signal 140 arranged to increase or decrease the light intensity of the at least one lighting device 150. The controller 110 compares a first and a second light level measurement comprised in the signal 120, wherein the first light level measurement is taken before the controller 110 increases or decreases the light intensity of the lighting device 150 and the second light level measurement is taken after the controller 110 has increased or decreased the light intensity of the lighting device 150. The controller 110 can determine that the light sensor 130 has been tampered with if there is no difference between the first and the second light level measurement or if the difference does not pass a threshold. The controller 110 can make this comparison once or multiple times to, for example, factor out other influences (e.g. measuring errors, influence on the light sensor 130 of light received from another light source than the lighting device 150). As an example, the controller 110 can be arranged to increase or decrease the light intensity of the at least one lighting device 150 each time the comparison is made (e.g. take a first light level measurement, increase the light intensity by 10%, take a second light level measurement, increase the light level measurement by an additional 10%, take a third light level measurement; and compare the three light level measurements). Other options include for the controller 110 to turn the at least one lighting device 150 off or on, as part of determining whether the light sensor 130 has been tampered with, or for the controller 110 to vary the light intensity level of the at least one lighting device in a specific pattern (e.g. a pattern that is unlikely to be present in daylight received or a pattern that minimizes discomfort or noticeability for a user). The control device 100 generates a lighting device control signal 140 arranged for controlling the light intensity of the at least one lighting device 150. The lighting device control signal 140 can be arranged to control, for instance, the dimming factor (e.g. on/off, dim to 70% light intensity), frequency (e.g. include flicker), color (e.g. change the color temperature, distribution of colors emitted) or direction of light emitted by the at least one lighting device 150. As a further example, the control device 100 can then determine whether the light sensor 130 has been tampered with by comparing the signal 120 before and after: changing the frequency from 50 Hz to 100 Hz, changing the color temperature from soft white to hard white, adding a spike in light of a certain color (e.g. keeping the color of the light as perceived by a user substantially the same, yet increasing the presence of one or more colors) or changing the direction of the light (e.g. change the focus of the beam, direct the light towards the light sensor 130). In yet another example, the control device 100 generates a lighting device control signal 140 arranged for including coded light (i.e. modulated light emissions embedding data) in the light emitted by the at least one lighting device 150. The controller 110 can then determine whether the light sensor 130 has been tampered with based on receiving this coded light (e.g. quality of coded light signal received).

In yet another example, the controller 110 compares a first and a second light level measurement wherein the first light level measurement is based on the signal 120 received from the light sensor 130 in a first time period and the second light level measurement is based on the signal 120 received from the light sensor 130 in a second time period. The first and the second time period can be selected to increase the likelihood that the light level of light received by the light sensor 130 from another light source than the lighting device 150 has changed. As an example, the light sensor 130 can be installed in a room 160 (e.g. an office room, a store room, a fitting room) having a window 170 through which light from an ambient light source 180 (e.g. the sun) is received. The light level of this ambient light source 180 can vary over time, for example clouds can block the sunlight entering the window 170, movement of the sun can affect the direction and amount of light entering the window 170 or street lighting turning on or off can affect the amount of light entering the window. The controller 110 can select the first and second time period to be close together (e.g. one minute or a few minutes apart), far removed from each other (e.g. half an hour or a day apart) or select the time periods based on a day night rhythm (e.g. half a day apart, a first time period during the day and a second time period during the night). Again, the controller 110 can use multiple light level measurements to decrease the chances of a false positive or false negative determination that the light sensor 130 has been tampered with. As an example, the controller 110 can take a first set of light level measurements a minute apart and take a third measurement after five minutes if no or a small difference was detected between the first and the second light level measurement.

These and other methods of determining whether the light sensor 130 has been tampered with can be used, for example, in combination with each other. The controller 110 can compare a first and second light level measurement taken minutes apart and based on the result decide to compare a daytime and nighttime light level measurement. If multiple light sensors are present in a system (not shown), the controller 110 can compare light level measurements taken from various light sensors (e.g. sensors that are close together or show similar patterns in light level measurements). Furthermore, the controller 110 can be arranged to store light level measurements to include historical data, for example, to achieve increased accuracy.

The control device 100 is, in this example, further arranged for generating a lighting device control signal 140 based on whether the light sensor 130 has been tampered with. In a first example, the control device 100 dims the at least one lighting device 150 to a predetermined level (e.g. 70%) when it has determined that the light sensor 130 has been tampered with and dims the at least one lighting device 150 to a variable level, based on the light level measurement received from the light sensor 130, if it has not determined that the light sensor 130 has been tampered with. The mode in which the control device 100 operates the at least one lighting device 150 if the light sensor 130 has been tampered with is indicated here as a fallback mode and the mode in which the control device 100 operates when it has determined that the light sensor 130 has not been tampered with is indicated here as a daylight harvesting mode. These modes are named as such for explanation purposes only. It is entirely possible that the default mode is the fallback mode, that there are multiple other modes or that the control device 100 operates in a single mode, for example, using a scale based on the likelihood that the light sensor 130 has been tampered with.

The fallback mode comprises the controller 110 generating a lighting device control signal 140 based on a stored program. In FIG. 1 the controller 110 comprises the stored program (e.g. embedded in a micro controller); other examples of such a stored program being accessible to the controller 110 comprise the stored program: being stored in a memory unit (not shown) accessible to the controller 110, being provided by a building management system to which the control device 100 can be operationally coupled (not shown) or accessible through the Internet (not shown). The stored program can be arranged for the controller 110 generating a lighting device control signal 140 according to a fixed setting (e.g. dim to 70% light intensity), a setting based on one or more variables (e.g. based on a time signal dim to 50% during daylight hours and 70% the rest of the time, based on weather type dim 60% if it is sunny or 80% if it is clouded) and could still be based on one or more light level measurements, for example if it has been determined that the light sensor 130 has been tampered with, but is still providing a signal 120 that can be used as a basis for daylight harvesting. In another example, the stored program triggers the controller 110 to use light level measurements from other light sensors (i.e. another light sensor than the light sensor 130 for which it has been determined that it has been tampered with). The stored program can comprise varying the dimming factor (e.g. to provide energy savings, provide compliancy with environmental law or regulations), varying the frequency (e.g. include flicker to discourage tampering with the light sensor 130 or to provide a trigger for a user to call maintenance), changing the color (e.g. change the color to increase efficiency of light generation or change the color to make it noticeable that the light sensor 130 has been tampered with) or provide a different direction in which light is emitted (e.g. in order to provide desk lighting, but save energy by limiting non task related lighting).

The daylight harvesting mode comprises a mode in which the light level measurement received from the light sensor 130 is a basis for generating a lighting device control signal 140. As an example, the controller 110 can access a lookup table (not shown) that relates a light level measurement to a dimming factor. As another example, multiple variables can be used such as the controller 110 accessing a weather report, personal preferences or other data and combining such data with the light level measurement as basis for generating a lighting device control signal 140. Furthermore the daylight harvesting mode can comprise the controller 110 generating a lighting device control signal 140 arranged for controlling one or more other factors than the light intensity level of the at least one lighting device 150, such as: varying the frequency (e.g. to increase user comfort), changing the color (e.g. to provide for the user perceiving a substantially constant light color of the combined light provided by the at least one lighting device 150 and the light from the ambient light source 180 entering the window 170) or providing a different direction in which light is emitted (e.g. focus the light of the at least one lighting device 150 on areas that receive little daylight). Other options (not shown) comprise the control device 100 having an audio indicator (e.g. a speaker for emitting a beep) and/or a visual indicator (e.g. an indicator light) that the controller 110 can turn on when it has been determined that the light sensor 130 has been tampered with. Furthermore, the control device 100 can be arranged to transmit a signal indicating that the light sensor 130 has been tampered with to an external monitoring system (not shown) (e.g. a building management system).

A user can tamper with a light sensor 130 in many ways, such as covering the light sensor (e.g. taping over it, putting a piece of clothing over it) or blocking its field of view (e.g. placing an object near it) to limit the amount of light that reaches it or to limit the capabilities of the light sensor to detect changes in light levels. Tampering can also include a user pointing a light source directly at the light sensor 130 (e.g. when a user wants the at least one lighting device 150 to dim or be turned off). In a further example, the controller 110 can differentiate between a situation in which the light sensor 130 has been tampered with and a situation in which the light sensor 130 is broken or is unavailable. Also, although FIG. 1 shows a single control device 100, the features of the control device 100 can be implemented in multiple components of the daylight harvesting system S.

Figure 2:
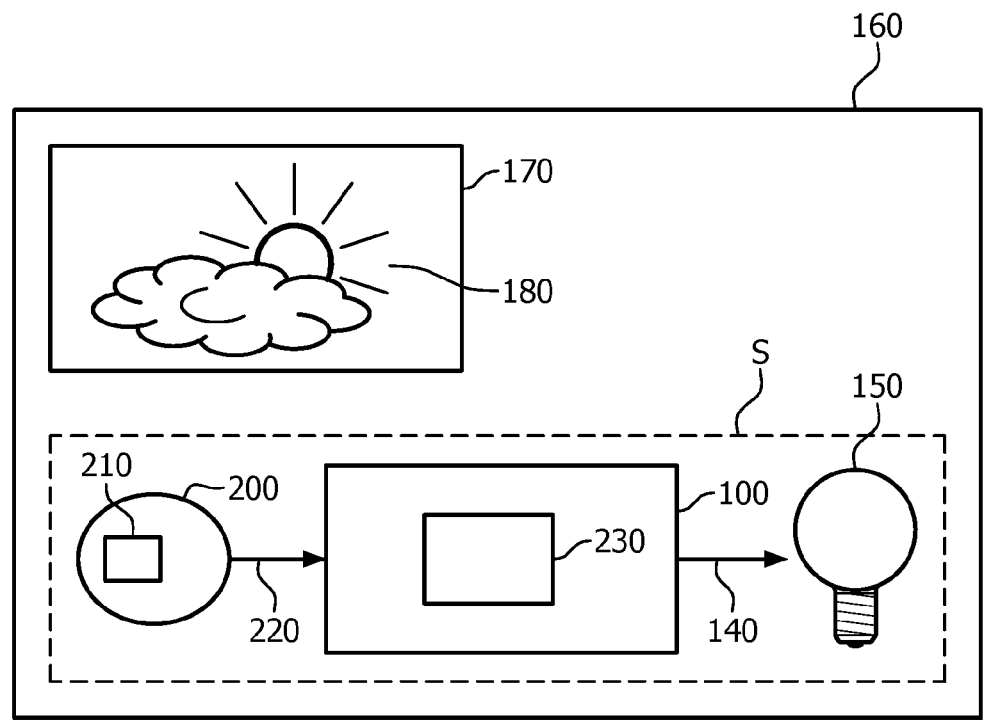
FIG. 2 shows schematically another embodiment of a daylight harvesting system comprising a control device according to the invention and a light sensor.

In FIG. 2, as an example, the daylight harvesting system S comprises a controller 210, 230 that is distributed in the sense that a light sensor 200 comprises a controller 210 to determine if it has been tampered with and other functionalities are included in the controller 230 in the control device 100. The light sensor 200 can then send a signal 220 to the control device 100, wherein the signal 220 comprises a light level measurement or an indication that the light sensor 200 has been tampered with. The controller 230 in the control device 100 can then simply go to a fallback mode if the signal 220 comprises an indication that the light sensor 200 has been tampered with or a daylight harvesting mode if the signal 220 does not comprise an indication that the light sensor 200 has been tampered with. Similar to the control device of FIG. 1 the control device of FIG. 2 can then, for example in the daylight harvesting mode, use the light level measurements of the light sensor 200 to dim the at least one lighting device 150 in the room 160 to account for light from an ambient light source 180 entering the room 160 through a window 170.

Figure 3:
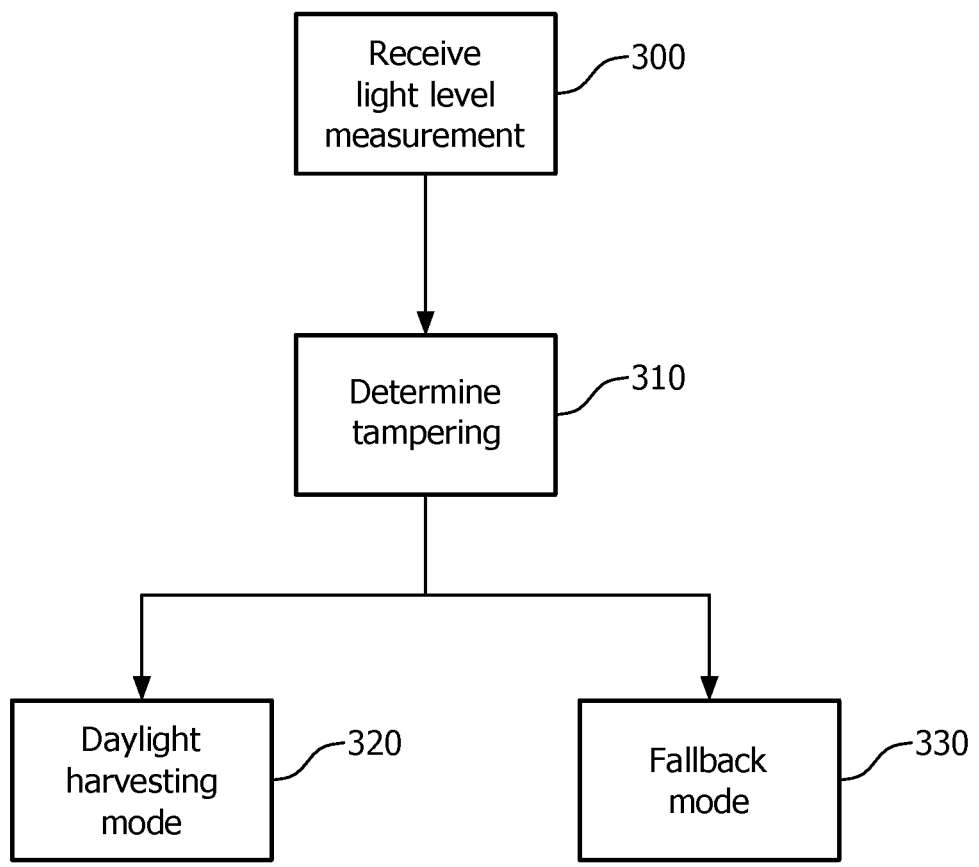
FIG. 3 shows schematically an embodiment of the method according to the invention.

FIG. 3 shows a schematic representation of the method according to the invention, comprising three steps: (1) receiving a light level measurement from a light sensor in step 300, (2) determining whether the light sensor has been tampered with in step 310; and (3) controlling the at least one lighting device in either step 320 or 330. The step of controlling the at least one lighting device can, such as in FIG. 3, consist of two options: controlling the at least one lighting device according to a daylight harvesting mode in step 320 or controlling the at least one lighting device according to a fallback mode in step 330. Other embodiments of the method according to the invention can comprise one of these or one or more other modes.

Figure 4:
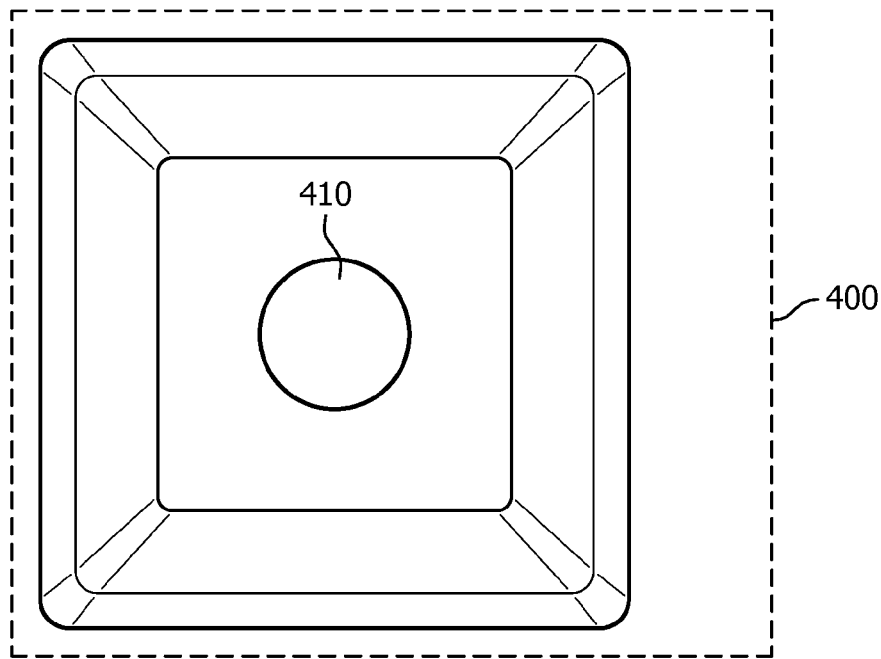
FIG. 4 shows an embodiment of a control device according to the invention comprising a light sensor.

FIG. 4 shows a bottom view of a ceiling mounted control device 400, such as the Philips OccuSwitch, comprising a light sensor 410. In this example, the light sensor 410 comprises an optical element visible from the outside of the control device 400 behind which the actual sensor is located. The control device and the method according to the invention can be implemented in other devices than the OccuSwitch (e.g. other light or occupancy sensors, multipurpose devices such as a camera or a mobile phone). Such a device can be mounted either inside the room where light level measurements are to be taken or at another location (e.g. integrated in a window, outside a window).

Figure 5:
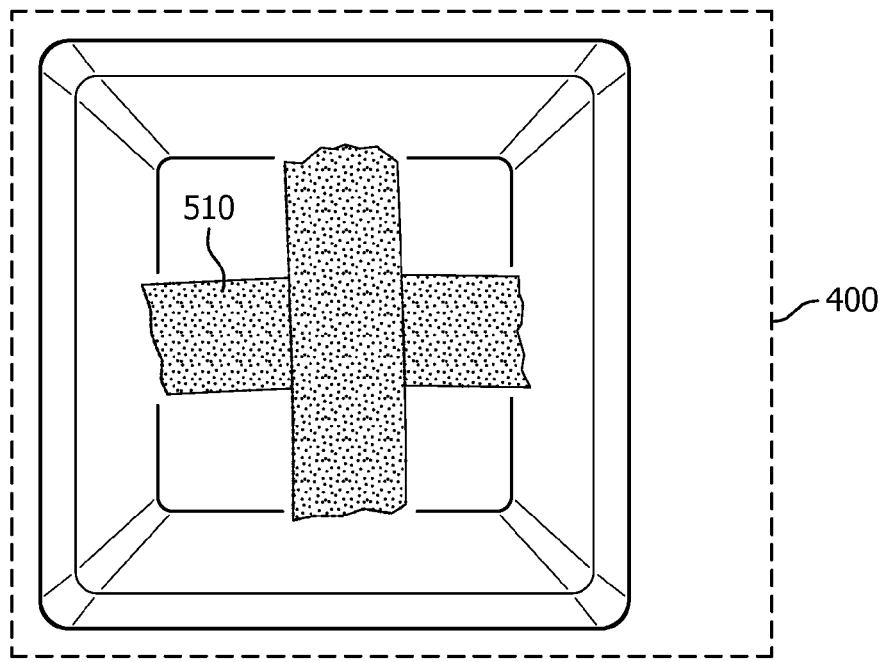

FIG. 5 shows the control device 400 of FIG. 4 where the light sensor (not visible) has been tampered with. Non-transparent tape 510 has been used to block the light sensor.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware or software. The usage of the words first, second and third, etcetera do not indicate any ordering. These words are to be interpreted as names. No specific sequence of acts is intended to be required unless specifically indicated.

The invention claimed is:

1. A control device for controlling the light intensity of at least one lighting device operationally coupled to the control device comprising:

an input arranged for receiving, from a light sensor operationally coupled to the input, light level measurements; and a controller arranged for determining, based on at least one light level measurement received via the input, whether the light sensor has been tampered with; and further arranged for controlling the at least one lighting device according to a fallback mode if it has been determined that the light sensor has been tampered with and controlling the at least one lighting device according to a daylight harvesting mode if it has been determined that the light sensor has not been tampered with;

wherein the fallback mode comprises controlling the light intensity of the at least one lighting device based on a stored program accessible to the controller; and wherein the daylight harvesting mode comprises controlling the light intensity of the at least one lighting device based on the at least one light level measurement, wherein the controller is arranged for determining whether the light sensor has been tampered with based on comparing the at least one light level measurement to any of:

a light sensor dark current value, a second light level measurement, wherein the second light level measurement is received via the input after the at least one lighting device has been controlled to either increase or decrease the light intensity, a third light level measurement, wherein the third light level measurement is received via the input in a second time period, and wherein the at least one light level measurement is received via the input in a first time period, and wherein the end of the first time period and the start of the second time period are at least one minute apart.

2. The control device of claim 1, wherein the controller is further arranged to control an audio or visual indicator based on determining whether the light sensor has been tampered with.

3. The control device of claim 1, wherein the controller is further arranged to transmit to an external monitoring system a signal indicating whether the light sensor has been tampered with.

4. The control device of claim 1, further comprising the light sensor operationally coupled to the input of the control device.

5. A daylight harvesting system (S) comprising the control device of claim 4, further comprising the at least one lighting device operationally coupled to the control device.

6. A method of controlling the light intensity of at least one lighting device in a daylight harvesting system comprising the steps of:

receiving a light level measurement from a light sensor;

determining whether the light sensor has been tampered with; and controlling the at least one lighting device in a daylight harvesting mode if the sensor has not been tampered with and controlling the at least one lighting device in a fallback mode if the light sensor has been tampered with;

wherein the fallback mode comprises controlling the light intensity of the at least one lighting device based on a stored program; and wherein the daylight harvesting mode comprises controlling the light intensity of the at least one lighting device based on at least one light level measurement, wherein the step of determining whether the light sensor has been tampered with comprises any of:

comparing at least one light level measurement to a light sensor dark current value, receiving a first light level measurement; controlling the at least one lighting device to either increase or decrease the light intensity; receiving a second light level measurement; and comparing the first light level measurement to the second light level measurement, comparing a first light level measurement received in a first time period to a third light level measurement received in a second time period, wherein the end of the first time period and the start of the second time period are at least one minute apart.

7. The method of claim 6, further comprising the step of controlling an audio or visual indicator based on determining whether the light sensor has been tampered with.

8. The method of claim 6, further comprising the step of transmitting to an external monitoring system a signal indicating whether the light sensor has been tampered with.

9. A computer program product for controlling the light intensity of at least one lighting device in a daylight harvesting system comprising software code portions for performing the steps of claim 6 when said product is run on a computer.

* * * * *